United States Patent [19]

Blake

[11] 4,384,696
[45] May 24, 1983

[54] COMPONENT RESTRAINT SYSTEM
[75] Inventor: John C. Blake, San Jose, Calif.
[73] Assignee: The United States of America as represented by the U.S. Department of Energy, Washington, D.C.
[21] Appl. No.: 311,204
[22] Filed: Oct. 14, 1981
[51] Int. Cl.³ .............................................. F16L 3/00
[52] U.S. Cl. ............................. 248/49; 248/DIG. 1; 248/55; 403/64
[58] Field of Search .................... 248/49, 65, 73, 55, 248/DIG. 1; 403/175, 64

[56] References Cited
U.S. PATENT DOCUMENTS

| | | | |
|---|---|---|---|
| 1,034,338 | 7/1912 | Beatty | 403/175 |
| 1,470,529 | 10/1923 | Gerber | 248/49 |
| 2,533,370 | 12/1950 | Haug | 248/55 |
| 3,278,950 | 10/1966 | Hutchins | 248/49 X |
| 3,286,280 | 11/1966 | Duggan | 248/49 X |
| 4,230,144 | 10/1980 | Chalmers | 248/49 X |

FOREIGN PATENT DOCUMENTS 2406869 10/1977 France.
2472129 7/1981 France .................................. 248/65

Primary Examiner—William H. Schultz
Assistant Examiner—Ramón O. Ramirez
Attorney, Agent, or Firm—Edwin D. Grant; Stephen D. Hamel; Richard G. Besha

[57] ABSTRACT

An object restraint system is provided with a collar for gripping the object and a plurality of struts attached to the collar and to anchor means by universal-type joints, the struts being arranged in tangential relation about the collar.

3 Claims, 4 Drawing Figures

COMPONENT RESTRAINT SYSTEM

BACKGROUND OF THE INVENTION

This invention, which is a result of a contract with the United States Department of Energy, relates in general to a component restraint system, and more particularly to a means for bracing a pipeline or other component subject to being severely shaken under abnormal conditions and exposed to a wide range of temperatures under normal conditions so that it expands and contracts.

In various installations, such as in a steam-generating plant, it is necessary to secure pipelines or other components to more stable structure to prevent extensive movement and subsequent stress of the apparatus that may occur under severe shock conditions, such as caused by an earthquake. Pipelines and other components in a steam-generating plant are subjected to a wide range of temperatures, and therefore restraint systems for such components must permit large, e.g., several inches, movements of the latter which result from temperature changes.

PRIOR ART

So far as the inventor knows, no means for restraining a pipeline, or other object, of the type disclosed herein has been available heretofore. Large and expensive devices known as "snubbers" have been in use for many years as a means for bracing various objects, but the construction of these known devices differs considerably from a restraint system arranged in accordance with the principles of this invention.

SUMMARY OF THE INVENTION

It is therefore an object of this invention to provide a lightweight but strong arrangement for holding an object such as a pipeline or other component in a predetermined position.

It is another object of the invention to provide a component restraint system which keeps the component from shifting a large distance in a radial direction relative to its longitudinal axis, but which permits expansion and contraction of the component axially of said axis as its temperature changes.

These objects are achieved by a preferred embodiment of the invention comprising an annular collar disposed in gripping relation around an object that must be braced against excessive movement, a plurality of anchor means spaced radially outward from and evenly spaced circumferentially about said collar, and a plurality of tie bars, or struts, which project between said collar and respective ones of said anchor means, the ends of these struts being connected by means of universal joints to said collar and respective ones of said anchor means, and the longitudinal axis of each of said struts normally being disposed (1) in a plane perpendicular to the central axis of said collar, and (2) perpendicular to a line intersecting the central axis of said collar. The collar is constructed of segments which spread apart to permit the gripped object to expand without placing stress on the collar or the gripped object. This is accomplished by use of a conical spring, or a series of conical springs, so designed that deflection of the spring or springs does not result in increased load on the collar.

DETAILED DESCRIPTION

Figure 1:
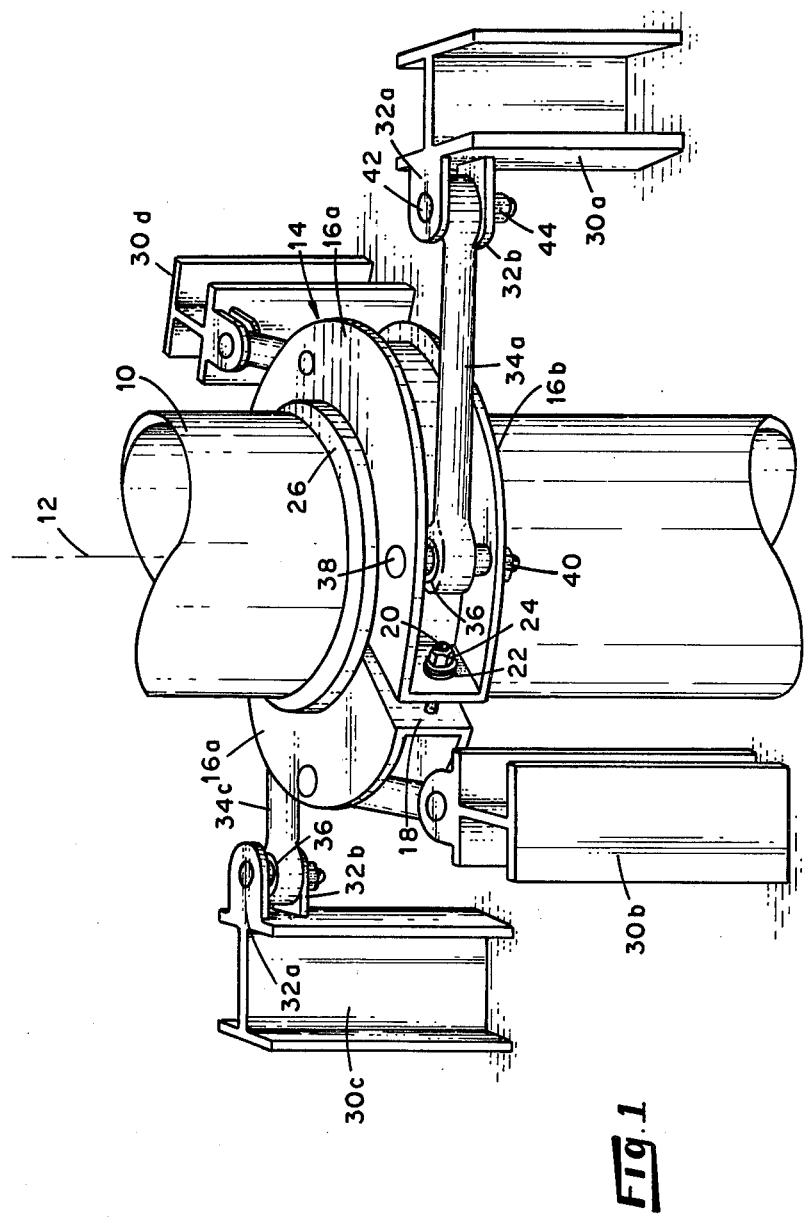
FIG. 1 is a perspective view illustrating the preferred embodiment of the invention.
Figure 2:
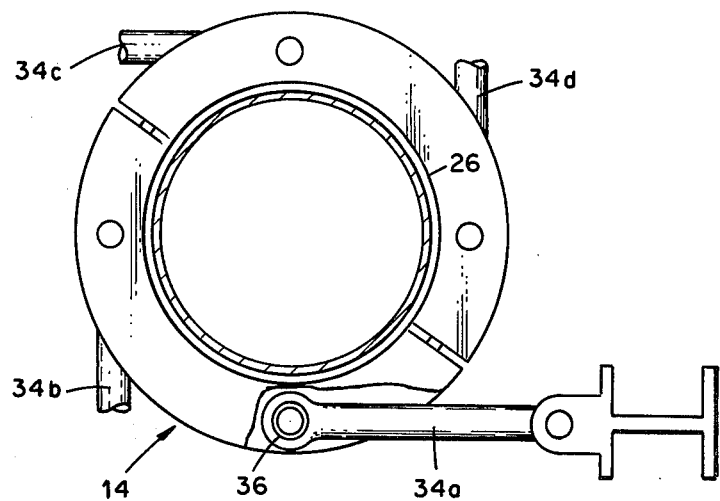
FIG. 2 is a plan view illustrating the same embodiment of the invention.

In the drawings reference number 10 designates a pipeline or other component which must be restrained against movement in the radial direction relative to its longitudinal axis 12 but permits limited movement in the axial direction. Reference number 14 generally designates an annular collar positioned around component 10, the surface of this collar which defines its central opening abutting the periphery of component 10. More specifically, collar 14 comprises two or more segments, each of these segments being formed with flange portions 16a, 16b spaced apart longitudinally of the central axis of the collar (which central axis coincides with the longitudinal axis 12 of component 10 and therefore will be designated by the same reference number hereinafter). The sides of the flange portions 16a, 16b lie in planes perpendicular to the central axis 12 of the collar, and each segment of the collar is provided with two end walls 18 that extend between, and are integrally joined to, the flange portions. Each wall 18 is formed with an aperture (not illustrated) and the shank of a bolt 20 extends through the apertures in confronting end walls 18 of the two segments of the collar. A conical-type washer or series of washers 22, referred to hereinafter as the Belleville spring(s), is disposed between an end wall 18 of one of the segments of the collar and the nut 24 associated with each bolt 20. If desired, rings 26, 28 may be mounted on component 10 in abutting relation with the sides of the flange portions 16a, 16b of the two segments of collar 14 to maintain the latter in fixed position longitudinally of the component.

Four or more stanchions 30a–30d are spaced radially outward from collar 14 and mounted on other structures so that they provide stable anchor means for component 10 when connected therewith by means which will soon be described. Preferably the stanchions are evenly spaced circumferentially of collar 14. A pair of support members 32a, 32b project from each stanchion 30a–30d in spaced, parallel relation relative to each other and in perpendicular relation with the central axis 12 of collar 14.

Projecting between collar 14 and the two support members of each stanchion 30a–30d is an elongate strut 34a–34d having an aperture formed in each end thereof. An annular bearing 36 having a curved inner surface is seated in the aperture at each end of each strut. A first mounting pin 38 is fitted in the bearing 36 at one end of each strut, and a curved surface intermediate the ends of the pin slidably mates with the curved inner surface of the bearing so as to form a universal-type joint therewith. The ends of each pin 38 respectively extend through apertures in the flange portions 16a, 16b of one of the segments of collar 14. The longitudinal axis of each of the first pins 38 is parallel with the central axis of collar 14, and preferably each pin 38 has an enlarged head portion and is held on the collar by a nut 40 threadedly engaged therewith. A second mounting pin 42 is likewise fitted in the bearing 36 at the other end of each strut 34a–34d, with its ends respectively extended through apertures in the support members 32a, 32b of one of the stanchions 30a–30d. These second pins 42 also have enlarged heads and are held in position by nuts 44, and their longitudinal axes are again parallel with the central axis 12 of collar 14.

OPERATION OF THE PREFERRED EMBODIMENT OF THE INVENTION

FIG. 1 illustrates the position of struts 34a–34d before component 10 has shifted axially because of expansion due to an increase in its temperature or because of a force applied to the component by a seismic shock. In this normal configuration, the longitudinal axis of each of the strut 34a–34d is perpendicular to the central axis 12 of collar 14.

Figure 3:
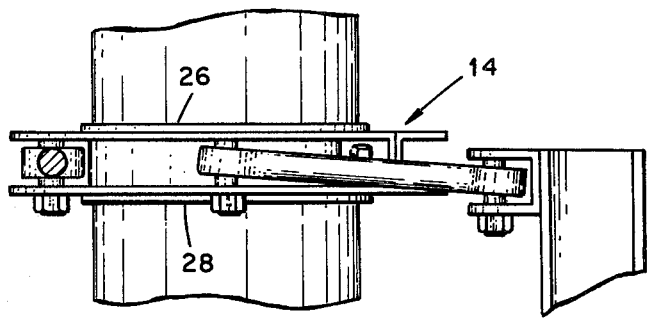
FIG. 3 is a side elevation illustrating the same embodiment of the invention, with certain components thereof shown in a position displaced from their normal position.

FIG. 3 illustrates the position of the struts after component 10 has shifted along its longitudinal axis. It will be seen in this drawing that the universal joints connecting each strut with the first and second mounting pins 38, 42 allow the struts to pivot about their opposite ends in planes parallel with the longitudinal axis 12 of collar 14. However, the pivotal movement of each strut is stopped when the strut engages one of the support arms 32a, 32b of stanchions 30a–30d. Thus the arrangement of the described restraint means permits limited movement of component 10 due to its axial expansion or contraction as a result of a temperature change, but a large radial shift of the component is prevented. Expansion of component 10 in a direction radial to its longitudinal axis is permitted because the segments 16a, 16b of collar 14 can move away from each other by compressing Belleville springs 22 that are designed to accommodate a radial expansion of the components without increasing the stress on the loading ring.

Figure 4:
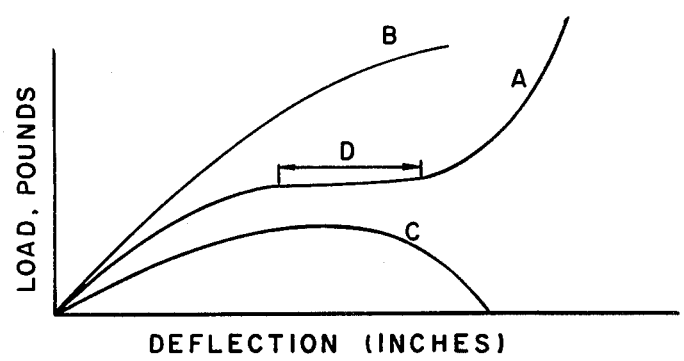
FIG. 4 is a graph illustrating characteristics of Belleville springs.

By controlling different ratios of their thickness, length, and diameter, Belleville springs may be made to exhibit different characteristics under load versus deflection as illustrated by curves A, B and C in FIG. 4. Curve A illustrates the characteristic of the type of spring that would be employed in apparatus in accordance with the invention since it could be preloaded into the loading zone D and increased deflection of springs, due to thermal expansion of the component, would not result in increased stress on the component 10 or the collar 14.

What is claimed is:

1. Apparatus for restraining an object while permitting limited movement thereof, comprising:

a collar arranged to grip the periphery of said object and formed in segments;

means for resiliently securing ends of said collar segments together to permit radial expansion of said object;

a plurality of anchors spaced radially outward from and circumferentially about said collar;

a plurality of elongate struts each projecting between said collar and a respective one of said anchors, each of said struts having an aperture formed in each end thereof, each of said apertures having a curved surface intermediate its ends, the longitudinal axis of each of said struts, before said object is moved, being disposed substantially perpendicular to the central axis of said collar; and a plurality of first mounting pins secured to said collar and respectively disposed in the apertures at the ends of said struts which are adjacent said collar, a plurality of second mounting pins respectively disposed in the apertures at ends of said struts which are adjacent said anchors, each of said first and second mounting pins being formed with a curved surface intermediate its ends which matingly engages the curved surface of the strut aperture in which the pin is disposed, the longitudinal axes of said first and second mounting pins being substantially parallel with the axis of said collar.

2. The apparatus of claim 1 wherein said means for resiliently securing the ends of said segments together comprises bolts and Belleville springs.

3. The apparatus of claim 1 wherein said collar comprises two flanges the sides of which lie in planes perpendicular to the central axis of said collar, the ends of each of said first mounting pins being respectively disposed in apertures formed in said flanges.

* * * * *